(12) United States Patent
Chen et al.

(10) Patent No.: US 12,117,951 B2
(45) Date of Patent: Oct. 15, 2024

(54) OPERATION METHOD OF A SOFTWARE PROGRAM MEETING SPECIFICATIONS OF UNIFIED EXTENSIBLE FIRMWARE INTERFACE FOR CONFIGURING A GENERAL-PURPOSE INPUT/OUTPUT PORT

(71) Applicant: Jabil Circuit (Singapore) Pte. Ltd., Singapore (SG)

(72) Inventors: Hung-An Chen, Taichung (TW); Ching-Yuan Wu, Taichung (TW); Shuo-Hung Hsu, New Taipei (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 177 days.

(21) Appl. No.: 18/146,539

(22) Filed: Dec. 27, 2022

(65) Prior Publication Data

US 2023/0205885 A1 Jun. 29, 2023

(30) Foreign Application Priority Data

Dec. 29, 2021 (CN) .......................... 202111636664.3

(51) Int. Cl.
*G06F 13/38* (2006.01)
*G06F 9/4401* (2018.01)
*G06F 15/177* (2006.01)
*G06F 21/57* (2013.01)

(52) U.S. Cl.
CPC .......... *G06F 13/385* (2013.01); *G06F 9/4401* (2013.01); *G06F 9/4411* (2013.01);
(Continued)

(58) Field of Classification Search
CPC ...... G06F 9/4401; G06F 9/4411; G06F 9/453; G06F 11/3051; G06F 13/385;
(Continued)

(56) References Cited

U.S. PATENT DOCUMENTS 10,509,750 B2 12/2019 Sachidanandam et al.
2005/0235069 A1* 10/2005 Miwa .................. G06F 13/4072
710/8

(Continued)

OTHER PUBLICATIONS

"Using GPIO from a Linux Shell". TechNexion Ltd. Online Sep. 30, 2021. Retrieved from Internet Aug. 8, 2024. <https://developer.technexion.com/docs/using-gpio-from-a-linux-shell>. (Year: 2021).*

(Continued)

*Primary Examiner* — Thomas J. Cleary
(74) *Attorney, Agent, or Firm* — Young Basile Hanlon & MacFarlane, P.C.

(57) ABSTRACT

An operation method of a software program meeting UEFI specifications for configuring a GPIO port is provided. The operation method includes: operating in a command-line mode to display, on a display device, a first prompt for guiding a user to input a string of command-line arguments; in response to receipt of a string of command-line arguments for reading content stored in a register that corresponds to one of GPIO pins of the GPIO port under the command-line mode, displaying, on the display device, a default value of the register that corresponds to a function of said one of the GPIO pins; and in response to receipt of a string of command-line arguments for setting a register that corresponds to one of the GPIO pins to a set value under the command-line mode, writing the set value to the register to replace a current value with the set value.

11 Claims, 5 Drawing Sheets

(52) U.S. Cl.
CPC .......... *G06F 15/177* (2013.01); *G06F 21/572* (2013.01); *G06F 21/575* (2013.01); *G06F 2221/034* (2013.01)

(58) Field of Classification Search
CPC ............. G06F 13/4063; G06F 15/0225; G06F 15/177; G06F 21/572; G06F 21/575; G06F 2221/034; Y02D 10/00
See application file for complete search history.

(56) References Cited

U.S. PATENT DOCUMENTS

| | | | |
|---|---|---|---|
| 2007/0162663 A1* | 7/2007 | Tang ................... | G06F 15/7814 710/62 |
| 2013/0080677 A1* | 3/2013 | Simmons ............ | G06F 13/4068 710/316 |
| 2016/0299770 A1* | 10/2016 | Doering .................... | G06F 1/26 |
| 2019/0026240 A1* | 1/2019 | Sachidanandam ...... | G06F 13/36 |
| 2021/0109880 A1* | 4/2021 | Lu .......................... | G06F 13/409 |

OTHER PUBLICATIONS

Akib. "All you need to know about the GPIO". Linkedin. Online Jun. 16, 2020. Retrieved from Internet Aug. 8, 2024. <https://www.linkedin.com/pulse/all-you-need-know-gpio-akib-islam>. (Year: 2020).*
Tranter, Jeff. "GPIO Programming: Using the sysfs Interface". Integrated Computer Solutions, Inc. Online Jul. 10, 2019. Retrieved from Internet Aug. 9, 2024. <https://www.ics.com/blog/gpio-programming-using-sysfs-interface>. (Year: 2019).*

* cited by examiner

```
Usage: JGPIO.efi [-a~z]
    -all                                        Dump all
    -<alphabet>                                 Dump specify group
    -vv <yes = 'y', no='n'>                     Save GPIO permanent
    -get <group> <padnumber>                    Get specify GPIO PAD_CFG_DW0 value
    -set <group> <padnumber> <options> <value>  Set specify GPIO PAD_CFG_DW0 value Example:
Enter interactive mode if you do not know how to use
>>> JGPIO.efi If you want to dump group A:
>>> JGPIO.efi -a If you want to get GRP_B20 PAD_DW0 value:
>>> JGPIO.efi -get b 20
```

FIG.3

PrintPadValue =0x44000200

Bit0=0
GPIO Tx State (GPIOTXSTATE):0 =Drive a level '0' to the Tx output pad.1=Drive a level '1' to the Tx output pad Bit1=0
GPIO Rx State (GPIORXSTATE): This is the current internal Rx pad state after Glitch filter logic state is not affected by PMode and RXINV settings

FIG. 4

FS2:\> JGPIO.efi -e

Group E

| PadNum | PMode | Direction | TX State | RX State |
|--------|---------|-----------|----------|----------|
| 00 | Native1 | In | 0 | 1 |
| 01 | Native1 | In | 0 | 1 |
| 02 | Native1 | In | 0 | 1 |
| 03 | Native1 | In | 0 | 1 |
| 04 | GPIO | In | 0 | 1 |

FIG.5

OPERATION METHOD OF A SOFTWARE PROGRAM MEETING SPECIFICATIONS OF UNIFIED EXTENSIBLE FIRMWARE INTERFACE FOR CONFIGURING A GENERAL-PURPOSE INPUT/OUTPUT PORT

CROSS-REFERENCE TO RELATED APPLICATION

This application claims priority to Chinese Invention Patent Application No. 202111636664.3, filed on Dec. 29, 2021.

FIELD

The disclosure relates to an operation method of a software program meeting specifications of Unified Extensible Firmware Interface (UEFI), and more particularly to an operation method of a software program meeting the specifications of UEFI for configuring a general-purpose input/output port.

BACKGROUND

In a computer system, a general-purpose input/output (GPIO) port includes a plurality of GPIO pins that are controlled by a plurality of registers. A conventional manner for reading a value from or writing a value to a register of one of the GPIO pins is to modify an operating system (OS) or a basic input/output system (BIOS). In order to read a value from or write a value to a register of a GPIO pin of a microcontroller, it is required to calculate an address of the register according to specifications of the microcontroller. In addition, even if the register has been changed, the register will be reset to a default value when the computer system reboots.

SUMMARY

Therefore, an object of the disclosure is to provide an operation method of a software program for configuring a general-purpose input/output port.

According to the disclosure, an operation method of a software program meeting specifications of Unified Extensible Firmware Interface (UEFI) for configuring a general-purpose input/output (GPIO) port of a server system is provided. The software program is installed in the server system that includes a display device. The GPIO port includes a plurality of GPIO pins. The operation method includes steps of: the software program operating in a command-line mode to display, on the display device, a first prompt for guiding a user to input a string of command-line arguments; in response to receipt of a string of command-line arguments for reading content stored in a register that corresponds to one of the GPIO pins under the command-line mode, the software program displaying, on the display device, a default value of the register, wherein the default value corresponds to a function of said one of the GPIO pins; and in response to receipt of a string of command-line arguments for setting a register that corresponds to one of the GPIO pins to a set value under the command-line mode, the software program writing the set value into the register to replace a current value with the set value.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 3 illustrates an exemplary display of a prompt for guiding a user to input a string of command-line arguments.

FIG. 4 illustrates an exemplary display of a default value of a register that corresponds to a GPIO pin of the GPIO port.

FIG. 5 illustrates an exemplary display of the information abstract related to a GPIO group.

DETAILED DESCRIPTION

Figure 1:
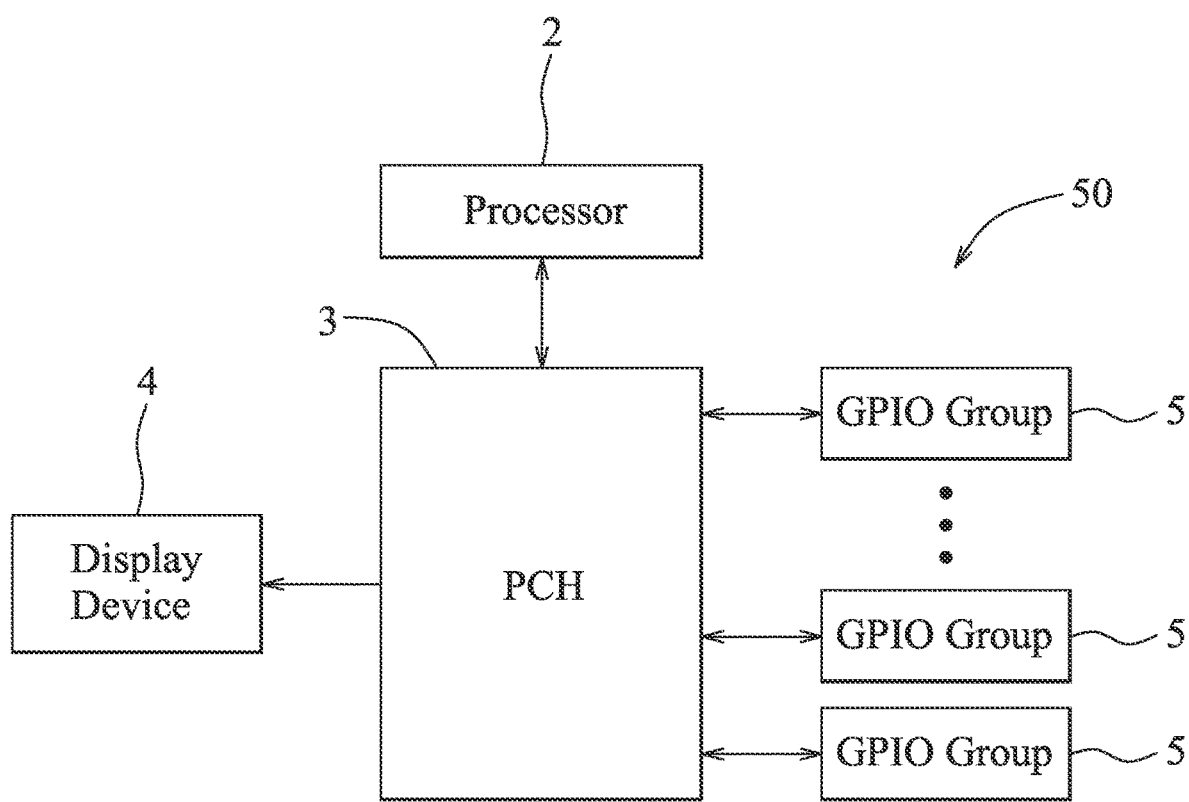
FIG. 1 is a block diagram of a server system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a server system according to an embodiment of the disclosure includes a processor 2, a platform controller hub (PCH) 3 electrically connected to the processor 2, a display device 4 electrically connected to the PCH 3, and a general-purpose input/output (GPIO) port 50 electrically connected to the PCH 3. The processor 2 is, for example, a central processing unit. The GPIO port 50 includes a plurality of GPIO pins that are divided into a plurality of GPIO groups 5 and that are grouped into a plurality of communities. Each of the communities consists of at least one of the GPIO groups 5. Each of the GPIO pins corresponds to a register (e.g., a 32-bit register) that stores a value indicating a function of the GPIO pin; that is to say, the function of the GPIO pin is controlled by the corresponding register according to a value stored in the register. The value stored in the register has 32 bits (i.e., bit 0 to bit 31). The server system has a software program meeting specifications of Unified Extensible Firmware Interface (UEFI) (hereinafter referred to as "UEFI program") installed therein for configuring the GPIO port 50.

Figure 2:
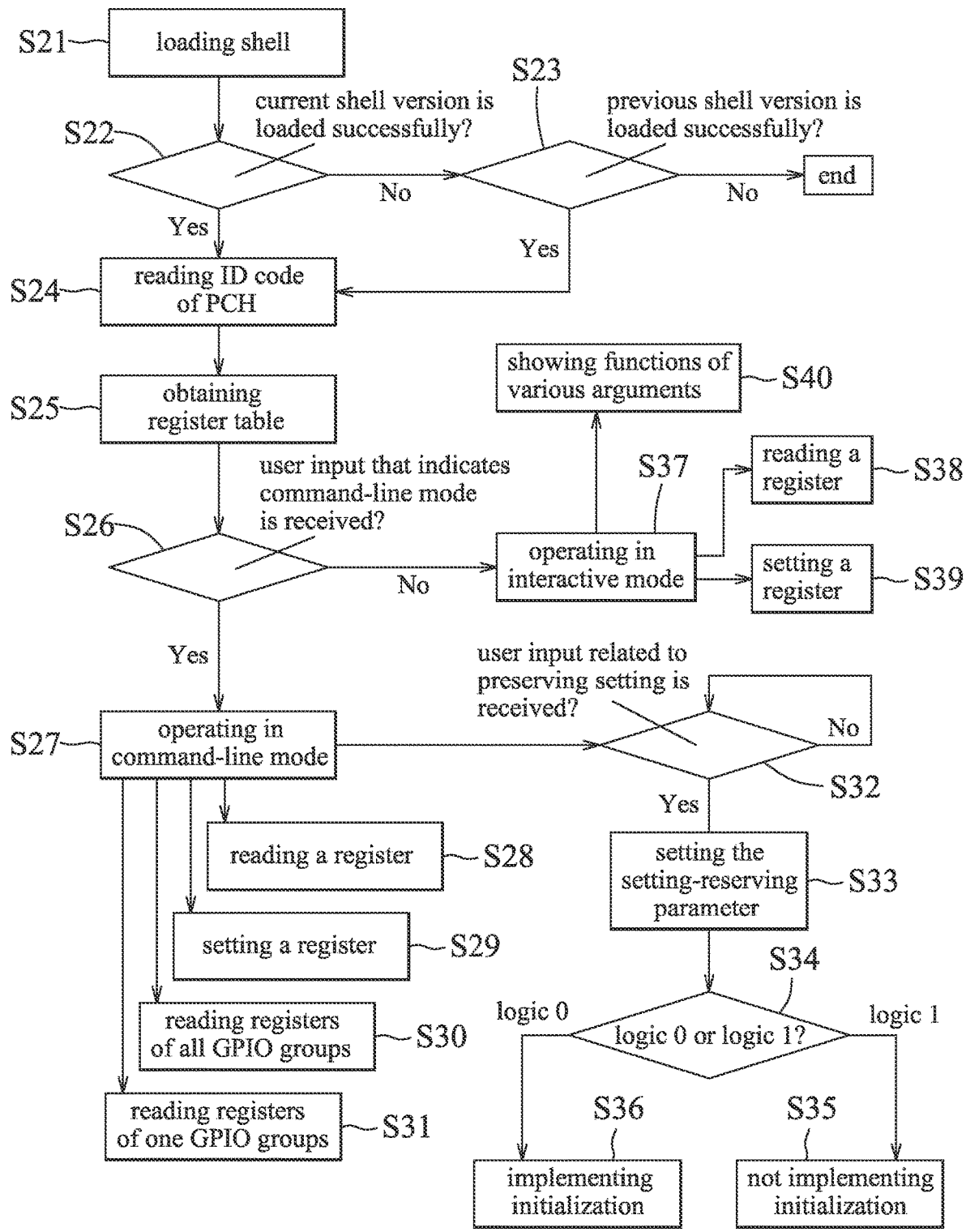
FIG. 2 is a flow chart of an operation method of a software program for configuring a general-purpose input/output (GPIO) port of the server system according to an embodiment of the disclosure.

Further referring to FIG. 2, an operation method of the UEFI program for configuring the GPIO port 50 is provided according to an embodiment of this disclosure.

In step S21, the processor 2 loads a shell of the UEFI program when the server system boots. The shell of the UEFI program is a UEFI application for providing an interface between a user and the UEFI program. For example, the processor 2 may load the shell from an external storage device (e.g., a USB flash drive), or the shell is embedded in the basic input/output system (BIOS) of the server system. For example, the shell of the UEFI program can support Intel® Whitley platform and Eagle Stream platform.

In step S22, the processor 2 determines whether a current version of the shell (e.g., Revision 2.0 or later) is loaded successfully (i.e., whether complete content of the current version of the shell is loaded). For example, the processor 2 executes the function OpenProtocol (EFI_SHELL_PARAMETERS_PROTOCOL_GUID) to check the version of the shell. When it is determined that the current version of the shell is not loaded successfully, the flow goes to step S23; when it is determined that the current version of the shell is loaded successfully, the flow goes to step S24.

In step S23, the processor 2 tries loading a previous version of the shell (e.g., Revision 1.0) and determines whether the previous version of the shell is loaded successfully. When it is determined that the previous version of the shell is loaded successfully, the flow goes to step S24; otherwise, the method is terminated.

In step S24, the processor 2 executes the shell to read an identification code of the PCH 3 and determines a model of the PCH 3 according to the identification code of the PCH 3. For example, the model of the PCH 3 may be the Emmitsburg PCH or the Lewisburg PCH. Each model of a PCH corresponds to a register table that stores, for each register, a default value of the register, and a function (state) of the corresponding GPIO pin, which corresponds to the register, indicated by the default value. In some embodiments, the processor 2 may further determine, according to the identification code of the PCH 3, a stepping level of the PCH 3 or whether the PCH 3 is an engineer sample (ES) or a qualification sample (QS).

Then, in step S25, the processor 2 obtains a register table that corresponds to the model of the PCH 3. For example, various register tables corresponding respectively to different models of the PCH 3 may be pre-defined by an array of variables of C language, and the processor 2 may call the array of variables to obtain the register table.

After step S25, the processor 2 determines whether a first user input indicating a command-line mode is received in step S26. The flow goes to step S27 when the first user input is received, and goes to step S37 when otherwise. For example, the processor 2 may be configured to determine that the first user input is received when a specific key or a specific combination of multiple keys of a keyboard (not shown) of the server system is pressed within a predetermined time period (e.g., 2 seconds) after the shell is executed, and to determine that the first user input is not received when otherwise. For example, when the first user input is "JGPIO.efi-e", the UEFI program operates in the command-line mode; when the first user input is "JGPIO.efi", the UEFI program operates in a user mode.

In step S27, the processor 2 executes the UEFI program and makes the UEFI program operate in the command-line mode to display, on the display device 4, a first prompt (see FIG. 3) for guiding a user to input a string of command-line arguments. In response to receipt of a string of command-line arguments, the flow may go to one of steps S28 to S31 according to the string of command-line arguments received in step S27.

In response to receipt of a string of command-line arguments for reading content stored in a register that corresponds to one of the GPIO pins under the command-line mode, the flow goes to step S28, in which the UEFI program displays, on the display device 4, the default value of the register that corresponds to a function of said one of the GPIO pins. The string of command-line arguments for reading content stored in a register includes a plurality of arguments, and can be expressed as "JGPIO.efi—get [GPIO group] [GPIO number]", where "GPIO group" is an argument indicating one of the GPIO groups 5 and "GPIO number" is an argument indicating said one of the GPIO pins. Specifically, step S28 includes obtaining an identification code of said one of the GPIO pins from the string of command-line arguments, obtaining an address of the register that corresponds to said one of the GPIO pins based on the identification code and an address-calculating function, obtaining the default value of the register according to the address, and displaying the default value and the state of said one of the GPIO pins on the display device 4. Specifically, the state of said one of the GPIO pins can be obtained from the PCH 3 with reference to the default value of the register thus obtained, and the address of each GPIO is recorded in the array of variables of C language. An exemplary display of the default value of the register is shown in FIG. 4. The string of command-line arguments "JGPIO.efi—get [GPIO group] [GPIO number]" is related to a detail mode, in which the default value will be displayed in detail (i.e., all bits of the default value will be displayed). For obtaining the default value of the register, a function for reading a 32-bit MMIO register is executed, and the function is expressed as MmioRead32(PCH_PCR_BASE_ADDRESS+((Target port ID of community<<16)+Offset), where "PCH_PCR_BASE_ADDRESS" is a base address of the PCH 3 defined by the specifications of the PCH 3 (e.g., 0xFD000000), "Target port ID of community" is an identification code of one of the communities that includes said one of the GPIO pins, "Offset" is an offset value of the register (DW0 register), and (PCH_PCR_BASE_ADDRESS+((Target port ID of community<<16)+Offset) is the address-calculating function.

In response to receipt of a string of command-line arguments for setting a register that corresponds to one of the GPIO pins to a set value under the command-line mode, the flow goes to step S29, in which the UEFI program writes the set value to the register to replace a current value with the set value in a volatile manner. It should be noted that, throughout this disclosure, the term "volatile manner" means that the set value will be replace by the default value once the server system reboots. The string of command-line arguments for setting a set value includes a plurality of arguments, and can be expressed as "JGPIO.efi—set [GPIO group] [GPIO number] all [set value]."

In response to receipt of a string of command-line arguments for reading content stored in the registers that correspond to all of the GPIO groups (i.e., to all of the GPIO pins of all of the GPIO groups) under the command-line mode, the flow goes to step S30, in which the UEFI program displays, on the display device 4, an information abstract related to the GPIO groups. Specifically, step S30 includes, for each of the GPIO pins, obtaining an identification code of the GPIO pin from the string of command-line arguments, and obtaining an address of the register that corresponds to the GPIO pin based on the identification code and the address-calculating function. Step S30 further includes obtaining the default values respectively of all registers, and displaying the default values and the information abstract respectively related to the states respectively of the GPIO pins on the display device 4.

In response to receipt of a string of command-line arguments for reading content stored in the registers that correspond to one of the GPIO groups (i.e., the registers that correspond to the GPIO pins of said GPIO group) under the command-line mode, the flow goes to step S31, in which the UEFI program displays, on the display device 4, an information abstract related to said one of the GPIO groups. An exemplary display of the information abstract related to one of the GPIO groups (e.g., Group E) is shown in FIG. 5. Specifically, step S31 includes obtaining an identification code of the GPIO group (e.g., code "E") from the string of command-line arguments, obtaining addresses respectively of the registers that correspond to the GPIO pins of the GPIO group based on the identification code and the address-calculating function, and obtaining the default values respectively of the registers by executing the function for reading a 32-bit MMIO register.

According to this embodiment, the UEFI program has a setting-preserving parameter that can be set to a first logic value (e.g., logic 1) indicating preservation of values respectively of registers that correspond to the GPIO pins, or a second logic value (e.g., logic 0) indicating initialization of the values of the registers. Under the command-line mode, the UEFI program determines whether a second user input indicating one of the first logic value and the second logic value of the setting-preserving parameter is received (step S32). In response to receipt of the second user input, the UEFI program sets the setting-reserving parameter to the first logic value or the second logic value according to the second user input (step S33); that is to say, the UEFI program sets the setting-reserving parameter to the first logic value when the second user input indicates the first logic value, and sets the setting-reserving parameter to the second logic value when the second user input indicates the second logic value. Then, when the server system reboots, the BIOS of the server system checks the setting-preserving parameter of the UEFI program and determines whether the setting-preserving parameter is the first logic value or the second logic value (step S34). When it is determined that the setting-reserving parameter is the first logic value, the BIOS does not implement initialization on the values of the registers during booting of the server system (step S35); that is to say, the values of the registers are kept unchanged. On the other hand, when it is determined that the setting-reserving parameter is the second logic value, the BIOS implements initialization on the values of the registers during booting of the server system so as to reset the registers, making each register have its default value (step S36).

When it is determined in step S26 that the first user input is not received, the UEFI program implements step S37 to operate in an interactive mode to display, on the display device 4, a plurality of second prompts for guiding the user to input command-line arguments interactively. In the interactive mode, the second prompts are configured to guide the user to input various command-line arguments one by one, and the various command-line arguments may each indicate one of the GPIO groups, or one of the GPIO pins, etc. In response to receipt of command-line arguments, the flow may go to one of steps S38 to S40 according to the command-line arguments received in step S37.

In response to receipt of command-line arguments for reading content stored in a register that corresponds to one of the GPIO pins under the interactive mode, the flow goes to step S38, in which the UEFI program displays the default value of the register on the display device 4, wherein the default value corresponds to a function of said one of the GPIO pins.

In response to receipt of command-line arguments for setting a register that corresponds to one of the GPIO pins to a set value under the interactive mode, the flow goes to step S39, in which the UEFI program performs a writing operation on the register to replace a current value with the set value in a volatile manner. Specifically, step S39 includes: executing a reading function to obtain the current value of the register; determining at least one target bit of the register, a value of which is to be set, according to the command-line arguments; determining, for each target bit, a bit value that is to be written to the target bit (hereinafter referred to as the "target bit value") according to the command-line arguments; executing a writing function to write the target bit value(s) to the target bit(s), so as to replace the current value of the register with the set value, wherein the set value includes multiple bits, with some bits having unchanged bit values (identical to those of the current value) and the at least one target bit with an updated bit value; and executing the reading function to obtain the new value of the register with the value of the target bit(s) having been changed to the target bit value(s). In an exemplary case where the register is a 32-bit register including 32 bits (bit 0 to bit 31), the set value will be a 32-bit value, and each target bit is one of the 32 bits of the register, and for each target bit, the target bit value of the target bit is the value that is to be written to the target bit. When it is desirable to set bit 1 to bit 3 of the register, bit 1 to bit 3 will be the target bits, and their desirable values are the target bit values. According to this embodiment, the reading function may be the function for reading a 32-bit MMIO register (MimoRead32). The setting function may be a function for writing a 32-bit MMIO register, and is expressed as:

MmioWrite32(PCH_PCR_BASE_ADDRESS+((Target port ID of community<<16)+Offset+Index*RegOffset,WriteValue), where "WriteValue" is the set value, and "RegOffset" is an interval between addresses of two registers (e.g., 8 for the registers of the Lewisburg PCH LBG, 16 for the register of the Emmitsburg PCH, etc.). In addition, the target bit value(s) relating to the set value can be obtained using the following function:

BitFieldWrite: OriginalValue|((OrData<<StartBit)&~((UINTN)-2<<(EndBit)), where "OriginalValue" is a current string of bit value(s) of the target bit(s), "OrData" is a string of the target bit value(s) to be written into the target bit(s), "StartBit" is the first one of the target bit(s), and "EndBit" is the last one of the target bit(s).

The command-line arguments may include a user input indicating one of the states of the GPIO pins that is to be set. The following Table 1 provides, for each state, different settings of the state and corresponding user inputs for setting the state.

TABLE 1

| State | Setting 1 | User Input | Setting 2 | User Input |
| --- | --- | --- | --- | --- |
| Pmode | Native1 | "a" | Native2 | "b" |
| Direction | Out | "o" | Input | "i" |
| Inversion | Inversion | "r" | No inversion | "n" |
| Tx State | Low | "l" | High | "h" |
| Level Edge | Level | "l" | Edge | "e" |
| Reset By | RSMRST# | "r" | HostDeep | "h" |

In Table 1, the state "Pmode" is to select a function of the GPIO pin, and the user input "a" and the user input "b" correspond respectively to a first native function (Native1) and a second native function (Native2) that are defined by the specification of the PCH 3; the state "Direction" indicates a direction of the GPIO pin (i.e., an input pin or an output pin), and the user input "o" and the user input "i" correspond respectively to an input pin and an output pin; the state "Inversion" indicates whether the state of the GPIO pin should go through the polarity inversion state, and the user input "r" and the user input "n" correspond respectively to polarity inversion state and no inversion state; the state "Tx State" indicates an output state of the GPIO pin, and the user input "1" and the user input "h" correspond respectively to low-level output and high-level output; the state "Level Edge" indicates that the Rx state of the GPIO pin is transmitted to a next logical stage in a form of a pulse signal (corresponding to the user input "e") or an electric level signal (corresponding to the user input "1"); and the state "Reset By" indicates a signal for resetting the register of the GPIO pin to the default value, and the user input "r" and the user input "h" correspond respectively to "RSMRST #" signal and "HostDeep" signal.

Further, in response to receipt of a command-line argument for showing functions that correspond respectively to various arguments, the flow goes to step S40, in which the UEFI program displays, on the display device 4, the functions that correspond respectively to various arguments.

To sum up, in the operation method according to this disclosure, the UEFI program is configured to automatically display the default value of the register or perform a writing operation on the register in response to receipt of command-line arguments for reading content stored in a register or for setting a register to a set value, and it is not required for a user to study technical specifications of the GPIO port to calculate an address of the register. Further, the UEFI program according to this disclosure can write a value to a register of a GPIO pin without modifying an operating system or the BIOS of the server system. Moreover, after the value of the register is updated, the register will not be reset back to default when the computer system reboots so the register retains the updated value.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An operation method of a software program meeting specifications of Unified Extensible Firmware Interface (UEFI) for configuring a general-purpose input/output (GPIO) port of a server system, the software program being installed in the server system that includes a display device, the GPIO port including a plurality of GPIO pins, the operation method comprising steps of:
   the software program operating in a command-line mode to display, on the display device, a first prompt for guiding a user to input a string of command-line arguments;
   in response to receipt of a string of command-line arguments for reading content stored in a register that corresponds to one of the GPIO pins under the command-line mode, the software program displaying, on the display device, a default value of the register, wherein the default value corresponds to a function of said one of the GPIO pins; and
   in response to receipt of a string of command-line arguments for setting a register that corresponds to one of the GPIO pins to a set value under the command-line mode, the software program writing the set value to the register to replace a current value with the set value.

2. The operation method as claimed in claim 1, the GPIO pins being divided into a plurality of GPIO groups, the operation method further comprising steps of:
   in response to receipt of a string of command-line arguments for reading content stored in registers that correspond to all of the GPIO groups under the command-line mode, the software program displaying, on the display device, an information abstract related to the GPIO groups; and
   in response to receipt of a string of command-line arguments for reading content stored in registers that corresponds to one of the GPIO groups under the command-line mode, the software program displaying, on the display device, an information abstract related to said one of the GPIO groups.

3. The operation method as claimed in claim 1, further comprising a step of:
   the software program operating in an interactive mode to display, on the display device, a plurality of second prompts for guiding the user to input command-line arguments interactively.

4. The operation method as claimed in claim 3, further comprising steps of:
   in response to receipt of a command-line argument for reading content stored in a register that corresponds to one of the GPIO pins under the interactive mode, the software program displaying, on the display device, a default value of the register, wherein the default value corresponds to a function of said one of the GPIO pins; and
   in response to receipt of command-line arguments for setting a register that corresponds to one of the GPIO pins to a set value under the interactive mode, the software program performing a writing operation on the register to replace a current value with the set value in a volatile manner.

5. The operation method as claimed in claim 4, wherein the step of the software program performing a writing operation on the register to replace a current value with the set value in a volatile manner includes:
   executing a reading function to obtain the current value of the register, the register including a plurality of bits;
   determining one of the bits of the register, a value of which is to be set, according to the command-line arguments;
   determining a target bit value that is to be written into said one of the bits according to the command-line arguments; and executing a writing function to write the target bit value to said one of the bits, so as to replace the current value of the register with the set value, which is the current value of the register with the value of said one of the bits having been changed to the target bit value.

6. The operation method as claimed in claim 5, wherein the step of the software program performing a writing operation on the register to replace a current value with the set value in a volatile manner further includes: executing the reading function to obtain a new value of the register.

7. The operation method as claimed in claim 1, further comprising a step of:
in response to receipt of a command-line argument for showing functions that correspond respectively to a plurality of different arguments, the software program displaying, on the display device, the functions that correspond respectively to the plurality of different arguments.

8. The operation method as claimed in claim 1, wherein the step of the software program displaying a default value of the register includes sub-steps of:
obtaining an identification code of said one of the GPIO pins from the string of command-line arguments;
obtaining an address of the register that corresponds to said one of the GPIO pins based on the identification code and an address-calculating function;
obtaining the default value of the register according to the address; and
displaying the default value on the display device.

9. The operation method as claimed in claim 8, the server system further including a platform controller hub (PCH) that is electrically connected to the GPIO port, the GPIO pins being divided into a plurality of GPIO groups and being grouped into a plurality of communities, each of the communities consisting of at least one of the GPIO groups, wherein the sub-step of obtaining the default value of the register is to execute a function for reading a 32-bit MMIO register, and the function is expressed as:

MmioRead32(PCH_PCR_BASE_ADDRESS+((Target port ID of community<<16)+Offset), where "PCH_PCR_BASE_ADDRESS" is a base address of the PCH, "Target port ID of community" is an identification code of one of the communities that includes said one of the GPIO pins, and "Offset" is an offset value of the register.

10. The operation method as claimed in claim 1, further comprising steps of:
the software program receiving a user input that indicates one of a first logic value and a second logic value under the command-line mode, the first logic value indicating preservation of values respectively of registers that correspond to the GPIO pins, the second logic value indicating initialization of the values of the registers; and
in response to receipt of the user input that indicates the first logic value, the software program setting a setting-preserving parameter to the first logic value, making a basic input/output system (BIOS) of the server system not implement initialization on the values of the registers during booting of the server system.

11. The operation method as claimed in claim 1, the server system further including a processor and a platform controller hub (PCH), the operation method further comprising steps of:
when the server system boots, the processor loading a shell of the software program;
the processor determining whether a current version of the shell is loaded successfully;
when the current version of the shell is loaded successfully, the processor executing the shell to read an identification code of the PCH and determining a model of the PCH according to the identification code of the PCH;
the processor obtaining a register table that corresponds to the model of the PCH and that includes, for each of the GPIO pins, a default value of a register that corresponds to the GPIO pin; and
in response to receipt of any command-line argument, the software program operating in the command-line mode.

* * * * *